Dec. 15, 1925. 1,566,210
J. R. S. HAWKER ET AL
APPARATUS FOR DELIVERING MEASURED VOLUMES OF LIQUID
Filed Dec. 15, 1924 6 Sheets-Sheet 3
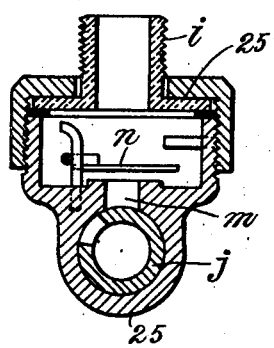
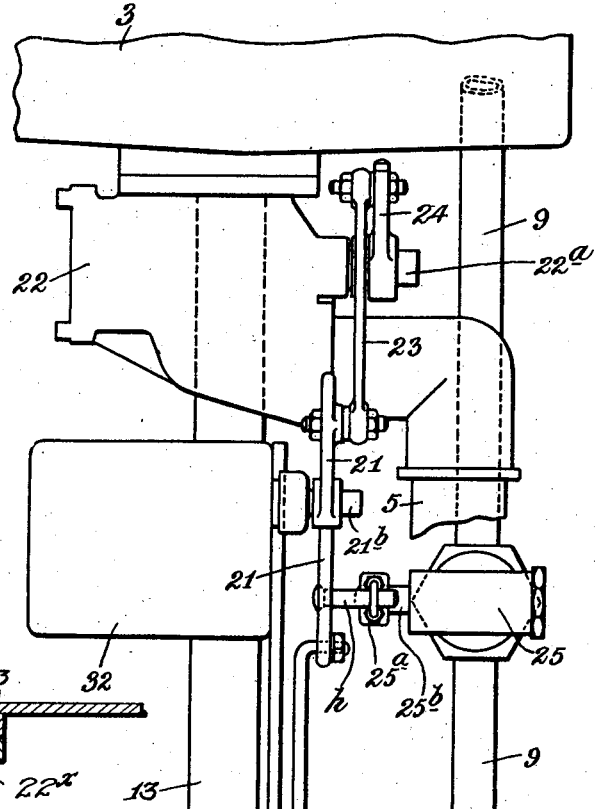
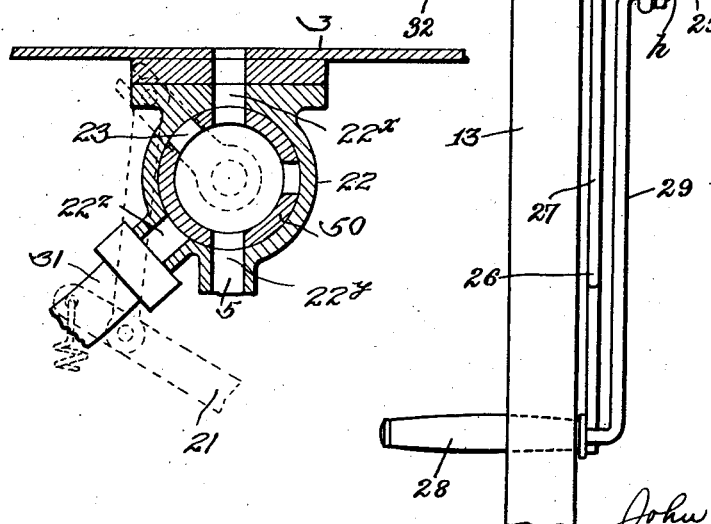

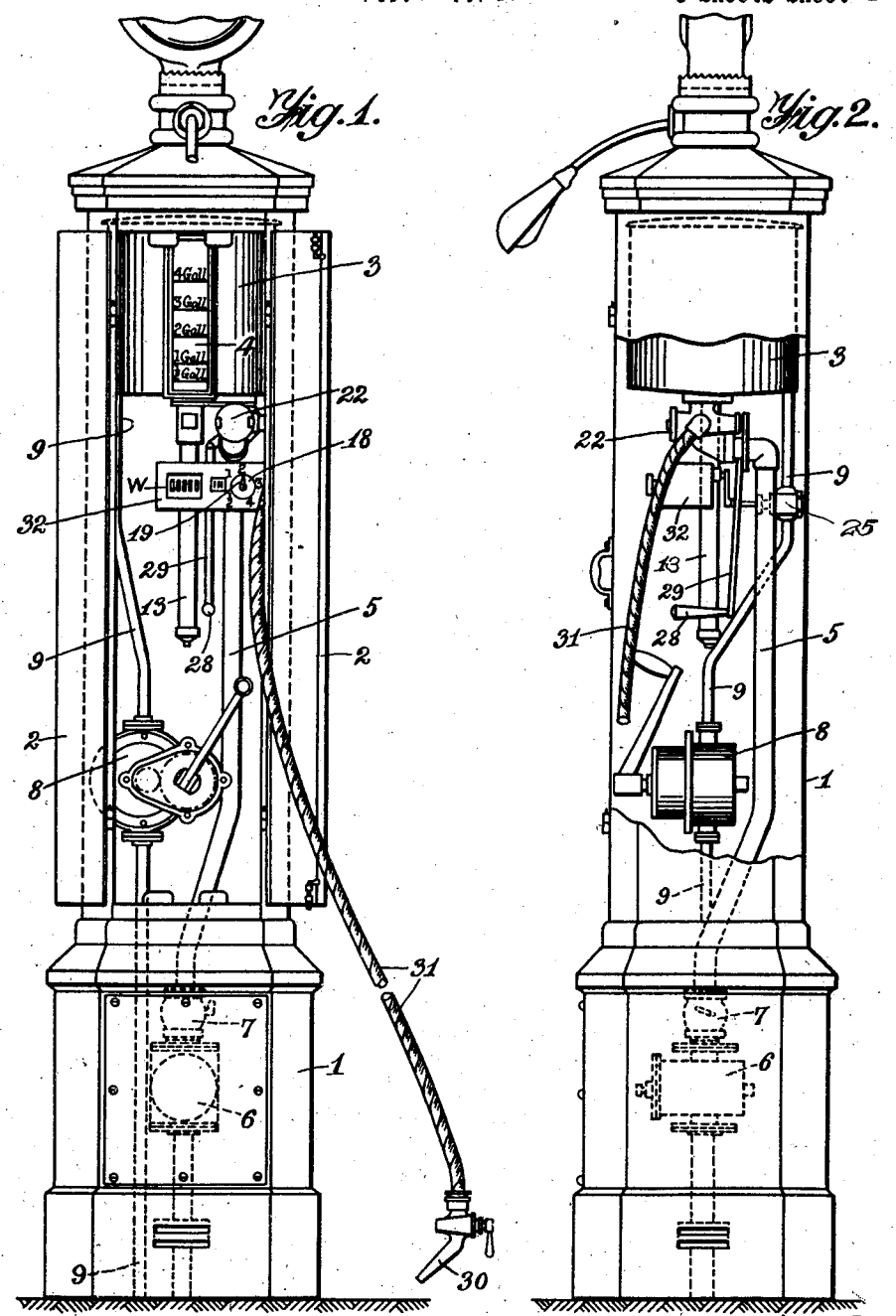

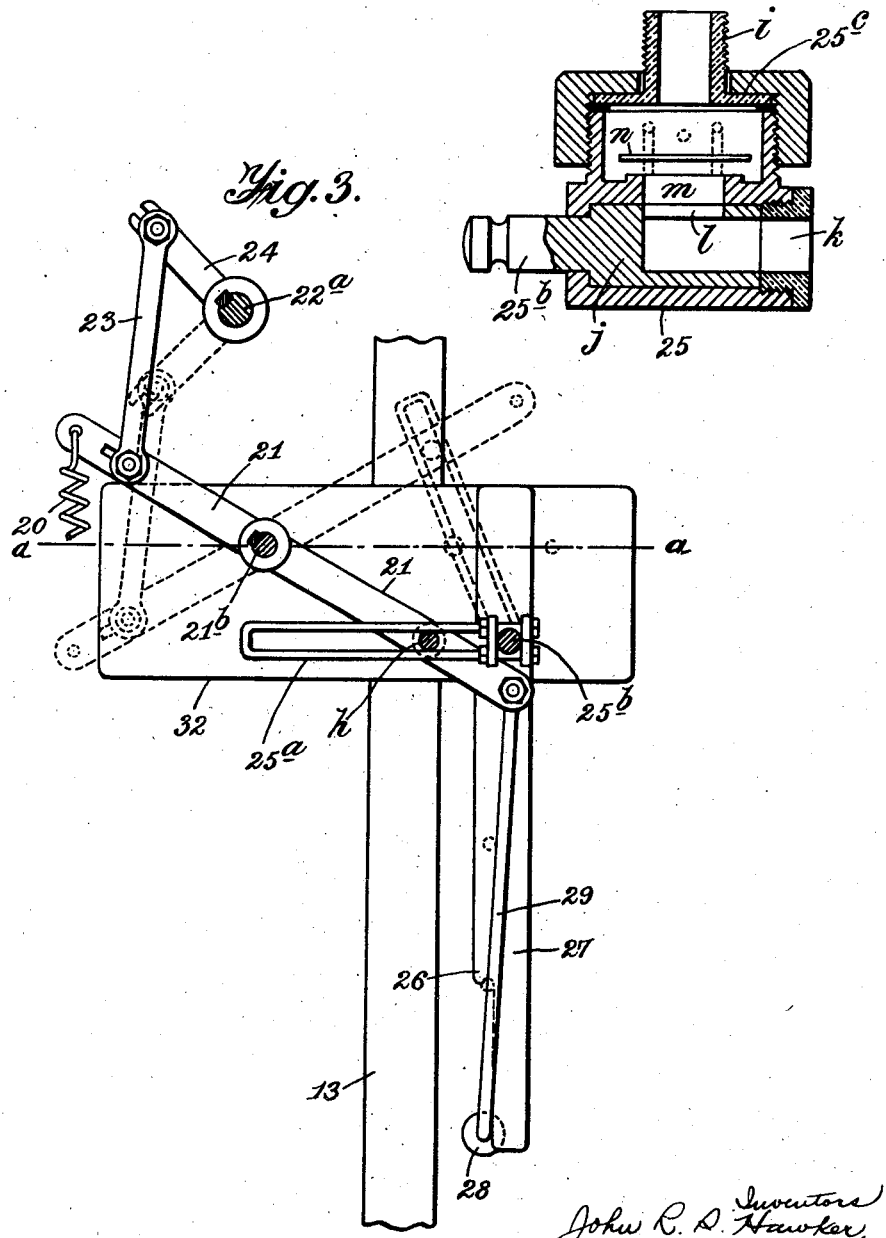

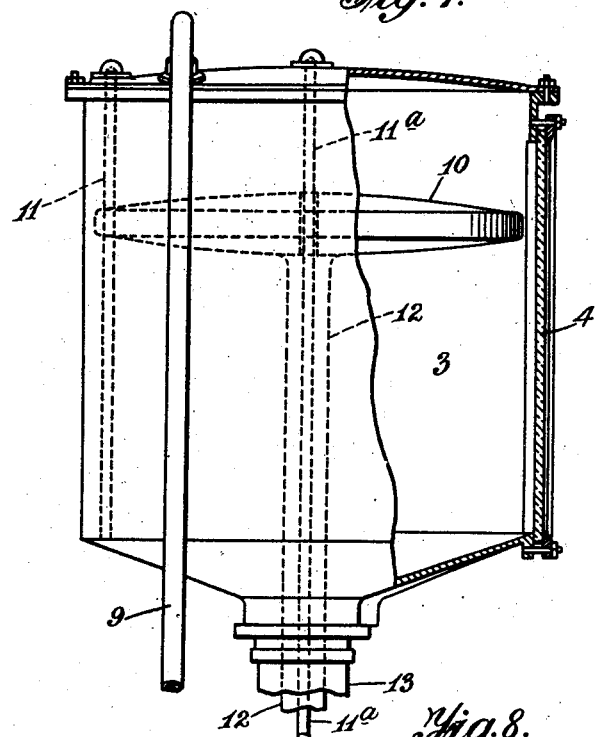
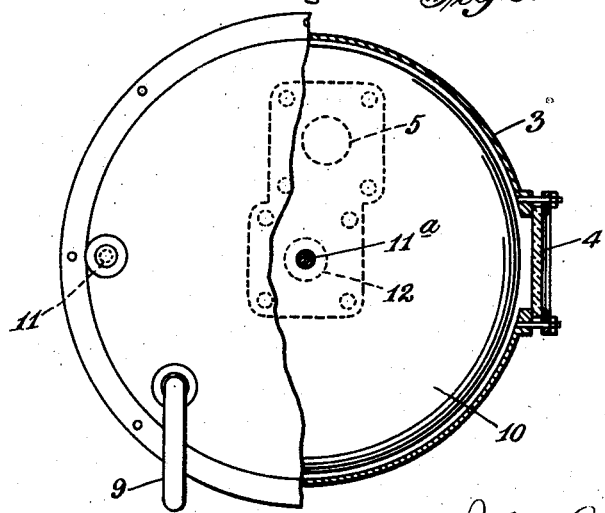

Dec. 15, 1925.                                              1,566,210
             J. R. S. HAWKER ET AL
      APPARATUS FOR DELIVERING MEASURED VOLUMES OF LIQUID
              Filed Dec. 15, 1924      6 Sheets-Sheet 5
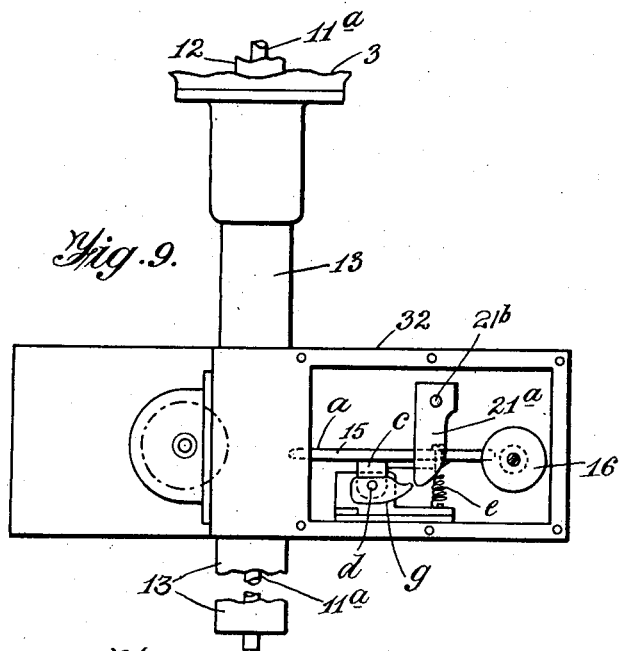
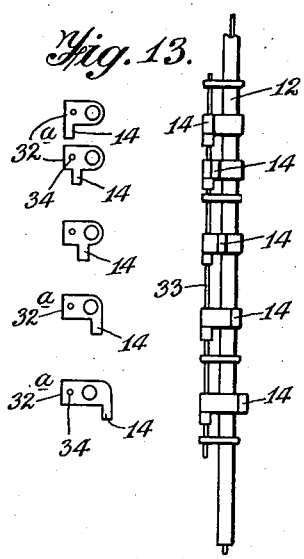
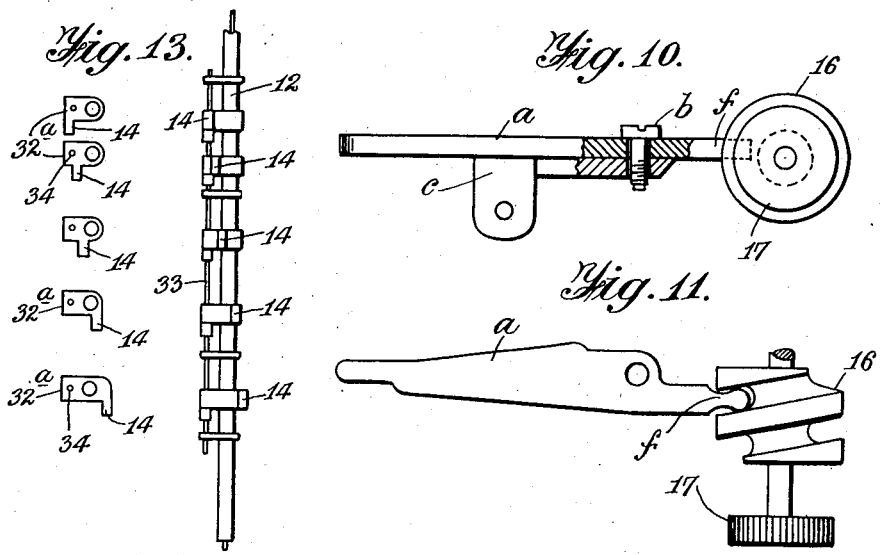
Inventors
John R. S. Hawker,
Alexander H. Hayes,
Herbert W. Smith,
Ralph N. Smith,
Isaac C. N. Smith,
by Bright & Bailey attys.

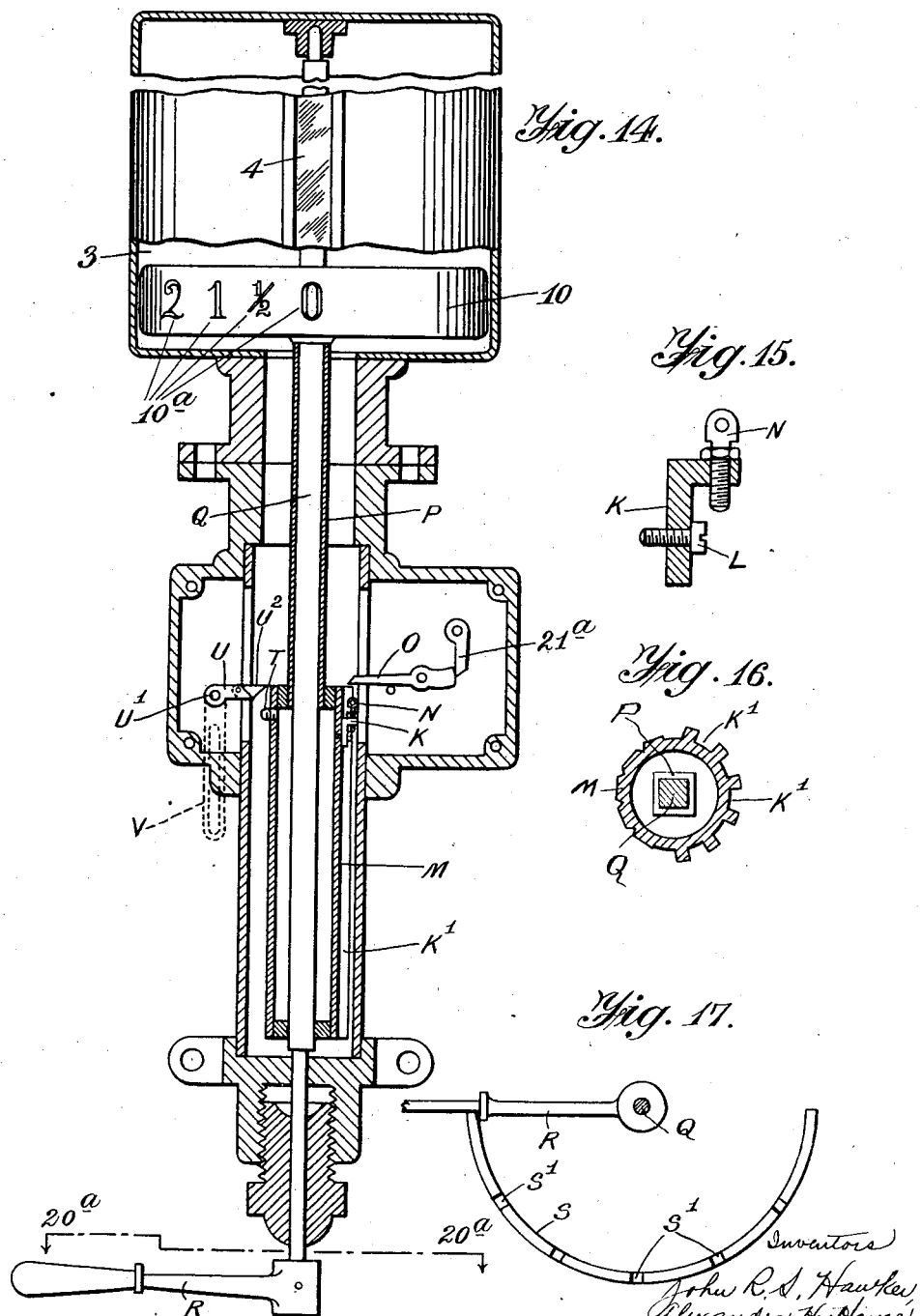

Patented Dec. 15, 1925.

1,566,210.

UNITED STATES PATENT OFFICE.

JOHN RAYMOND STUART HAWKER, ALEXANDER HENRY HAYES, HERBERT WILLIAM SMITH, RALPH VERNON SMITH, AND ISAAC CLAUDE VICTOR SMITH, OF NOTTINGHAM, ENGLAND.

APPARATUS FOR DELIVERING MEASURED VOLUMES OF LIQUID.

Application filed December 15, 1924. Serial No. 756,048.

*To all whom it may concern:*

Be it known that we, JOHN RAYMOND STUART HAWKER, ALEXANDER HENRY HAYES, HERBERT WILLIAM SMITH, RALPH VERNON SMITH, and ISAAC CLAUDE VICTOR SMITH, all subjects of the King of Great Britain, and all residing at Nottingham, England, have invented Apparatus for Delivering Measured Volumes of Liquid, and for which invention we have made application for patent in Great Britain, No. 30,456, filed December 4, 1923, and we do hereby declare the following to be a full, clear, and exact description of the invention, such as will enable others skilled in the art to which it appertains to make and use the same.

Our invention relates to liquid measuring and dispensing devices of the vacuum type, that is, of the type wherein a secondary tank or chamber is connected with a main tank or reservoir to receive liquid in predetermined amounts from the latter whereby the liquid is measured before being dispensed, our purpose, generally speaking, being to provide means for creating a vacuum in the secondary tank or chamber to cause liquid to flow into the same from the main tank or reservoir, to provide means whereby the flow of liquid into the secondary tank or chamber is cut off automatically when a predetermined quantity of liquid has entered said tank or chamber, and to provide means whereby the liquid drawn into said tank or chamber may be dispensed therefrom, all in a simple, compact efficiently operating mechanism requiring a minimum amount of attention on the part of the operator thereof.

More particularly it is our purpose to provide various improvements in the details of our mechanism whereby it is cheap and easy to produce and positive and accurate in operation.

In the accompanying drawings, wherein are illustrated certain preferred embodiments of our invention, and wherein like characters of reference denote corresponding parts in the different views:

Figs. 1 and 2 are front and side views respectively, of one embodiment of apparatus according to this invention.

Figs. 3 and 4 are front and side elevations respectively of the mechanism for operating the cock and the air valve for controlling the supply and discharge of liquid into and from the measuring chamber.

Figs. 5 and 6 are longitudinal and transverse sectional views of the air valve.

Figs. 7 and 8 are respectively views in part sectional front elevation and part section plan of the measuring compartment.

Fig. 9 is an elevation of the tripping gear for enabling the liquid control cock and air valve to be operated, the cover cap of the compartment for the gear being removed for clearness.

Figs. 10 and 11 are respectively a part sectional front view and a plan view of the device for predetermining the volume of liquid to be delivered into the measuring chamber.

Fig. 12 is an elevational view of the rod carrying radiating fingers adapted to engage the tripping gear for operating same, and Fig. 13 is a plan view showing the relative positions of the fingers.

Fig. 14 is a sectional elevation of an alternative means of operating the tripping gear.

Fig. 15 is a sectional enlarged view of one of the elements employed in this alternative means, such elements being an equivalent of the fingers shown in Fig. 13, and Fig. 16 is a sectional plan view of the sleeve carrying these elements.

Fig. 17 is a diagrammatic plan view of the means for predetermining the volume of liquid to be measured.

Fig. 18 is a sectional view showing a conventional form of three-way valve employed in our device.

Referring to the drawings it will be seen that the configuration of the apparatus shown is somewhat similar to existing devices in order to comply with the almost general aversion of persons to depart from the conventional appearance of devices. However it will be apparent that the appearance of the device may be altered appreciably without departing from the spirit and scope of this invention. The usual cylindrical or polygonal casing 1 is provided, having a door or doors 2 for convenient access to its interior. The measuring chamber is indicated by the reference numeral 3 and is provided with a transparent portion 4 marked in any convenient manner to indicate the levels of different volumes of liquid. The liquid is raised into the chamber 3 through a pipe 5 which is immersed in the liquid in the source of supply located beneath the apparatus. A filter 6 and a nonreturn valve 7, both of which may be of any suitable type, are included in this uptake pipe 5.

The liquid is raised into the chamber 3 by creating a vacuum or partial vacuum therein, and this is effected by means of a suitable pump 8 which communicates by means of a pipe 9 with the interior of the chamber 3, such pipe 9 preferably being carried down so as to discharge the air abstracted from the chamber 3 into the well accommodating the liquid beneath the apparatus.

Located in pipe 5 is a three way valve of any preferred type, the same being herein shown as including a casing 22 having circumferentially spaced ports $22^x$, $22^y$ and $22^z$ therein, the first of which is connected to chamber 3, the second of which is connected with that part of pipe 5 between said valve and the liquid reservoir below the apparatus and the third of which is connected with a discharge hose 31. Rotatable within said casing 22 is a plug 50 having intersecting ports therein so arranged that when the plug is in one rotated position, its normal position, they establish communication between the casing ports $22^x$ and $22^y$, the port $22^z$ at the same time being blanked, so that upon creation of a vacuum within chamber 3 liquid will be drawn into the same. As is apparent from the showing in Fig. 18, however, if plug 50 is rotated slightly, counter-clock-wise in this instance, all of the ports $22^x$, $22^y$ and $22^z$ will be blanked so that liquid may neither be drawn into nor discharged from chamber 3, while by slight continued rotation of said plug ports $22^x$ and $22^z$ will be placed in communication with one another and port $22^y$ will be blanked, so that while liquid still may not be supplied to chamber 3, it may be drawn off therefrom through hose 31.

One of the chief characteristic features of this invention is the means for determining the volume of liquid to be delivered into the chamber 3. This means comprises a float 10 disposed within the chamber 3 and guided along vertical rods 11 fixed within the chamber 3. This float carries with it a depending tail tube or sleeve 12 which moves vertically within a sleeve 13 and slides over a central vertical rod $11^a$.

This tail piece 12 carries a plurality of fingers 14 vertically adjustable along said tailpiece and arranged at different heights and in stepped formation, or in other words laterally offset with respect to one another. Each finger is in the form of a block $32^a$ secured to the tail piece 12 in any suitable manner, each tail piece having a hole 34 therein through which a rod 33 is adapted to be passed to hold all of the fingers in correct stepped relation with respect to one another.

Within a sealed casing 32 that is fixed with respect to sleeve 13 is a bracket $c$ pivoted as at $d$ for rocking movement and in turn having pivoted thereto as at $b$ for horizontal swinging movement a trip arm $a$ one end of which extends through a slot in sleeve 13 into operative relation with the fingers 14 and the other end $f$ of which engages a quick pitch threaded member or worm 16 having a head 17 whereby it may be rotated to swing the trip arm $a$ to cause it to lie in the path of vertical movement of any selected finger 14.

A spring $e$ serves to return arm $a$ to its normal horizontal position whenever it is rocked on pivot $d$, while affixed with respect to said arm so as to rock therewith is a stop member $g$ which lies normally in the path of a finger $21^a$ affixed to a rotatable shaft $21^b$ whereby rotation of said shaft normally is prevented. Upon rocking movement of arm $a$, however, such as is imparted thereto by raising of float 10 and consequent engagement of one of the fingers 14 with said arm, the stop member $g$ is moved out of engagement with the finger $21^a$ and shaft $21^b$ then is free to be rotated.

Shaft $21^b$ projects exteriorly of casing 32 and has affixed thereto an arm 21 connected by a link 23 with an arm 24 affixed to a stem $22^a$ of the valve plug 50. When stop $g$ is in engagement with finger $21^a$ as shown in Fig. 9, arm 21 is held in the full line position of Fig. 3 and the three way valve is held in the position of Fig. 18 establishing communication between the pipe 5 and the chamber 3 and denying communication between tank 3 and the hose 31. When arm $a$ is tripped, however, and stop $g$ as a consequence moved out of engagement with finger $21^a$, a tension spring 20 attached at one end to a fixed part of casing 1 and at its other end to arm 21 pulls said arm to the dot and dash line position $a$—$a$ shown in Fig. 3 in which position said arm is stopped by engagement of a laterally offset handle portion of a pendant arm 29 carried by the arm 21 coming into contact with an abutment 26 in a fixed bar 27. When the arm 21 is in the dot and dash line position of Fig. 3, the arm 24 is in a position where it holds the valve plug 50 blanking each of the ports $22^x$, $22^y$ and $22^z$.

The valve arm 21 carries a laterally projecting pin $h$ which engages in a slotted arm $25^a$ secured to the valve spindle $25^b$ of the air valve 25. This air valve 25 is secured by a T piece $25^c$ and a threaded extension $i$ to an air pipe 9. The rotatable valve portion $j$ of this valve 25 is hollow and communicates with the atmosphere through the open end $k$, an opening $l$ bringing the pipe 9, and consequently the measuring chamber 3 into communication with the atmosphere by registering with the opening $m$. Normally the valve portion $j$ closes the opening $m$ so that the pump 8 is free to exhaust air from the chamber 3 until the valve portion $j$ is rotated consequent upon the float 10 reaching the predetermined level by means of the liquid drawn into the chamber 3 to replace the abstracted air. When the valve portion $j$ is moved to open the aperture $m$ it will be apparent that atmospheric air will flow into the pipe 9 and that continued operation of the pump 8 will have no effect in the chamber 3, the air passage in the valve portion $j$ being larger than the passage in the chamber 3 communicating with the pipe 9. Should it be required to discharge quickly the contents of the chamber 3 the pump 8 can be worked in an opposite direction to that in which it is worked to draw air from the chamber 3, with the result that air will be forced into the chamber 3 and accelerate discharge of the liquid therefrom. A clack valve $n$ closes the opening $m$ when the pump is being employed to force air into the chamber 3.

In order to enable any back flow of liquid in the supply pipe 5 to be checked, if desired any suitable type of non-return valve may be provided which normally prevents return, or a too rapid return, of the liquid in the pipe 5 to the well into which it is immersed.

The pump 8 is preferably of the well known radial blade type. The filter 6 may be of any suitable or conventional type and is preferably located in an accessible position as near as possible to the measuring chamber.

Our device operates as follows: First the attendant manipulates worm 16 to swing arm $a$ to a position where it will engage a selected one of the fingers 14 as the tail piece 12 moves upward with float 10 under the influence of liquid accumulating in chamber 3, a dial or like indicator 18 enabling the attendant, by means of a pointer 19 to ascertain which of the fingers 14 will engage arm 15, the fingers as is understood being vertically spaced along tail piece 12, so that an exact predetermined quantity of liquid entering chamber 3 will raise float 10 a distance to bring a given finger into contact with arm $a$. When the proper adjustment of the worm 16 has been made pump 8 is operated to draw air from chamber 3 thus causing liquid to flow into said chamber through pipe 5 and the three way valve which is as aforesaid normally in position providing communication between chamber 3 and the supply tank or reservoir, valve 25 at the same time being closed. When enough liquid has entered chamber 3 to raise the float 10 a sufficient distance to cause the selected finger 14 to move up and strike arm $a$, said arm is rocked on its pivot $d$ and finger $21^a$ is released, whereupon spring 20 pulls arm 21 to the dot and dash line position $a$—$a$ of Fig. 3, thus manipulating the three way valve to cut off the supply of liquid to chamber 3 and at the same time opening valve 25 to the atmosphere so as to nullify the effect of any continued operation of pump 8. When arm 21 is stopped at the dot and dash line position $a$—$a$ of Fig. 3 by the pendant arm 29 engaging abutment 26, communication between the chamber 3 and the hose 31 also is denied so that the predetermined volume of liquid trapped within chamber 3 remains in said chamber until the attendant releases arm 29 from the stop 26 whereupon spring 20 operates to move arm 21 to the dotted line position of Fig. 3 with the result that the hose 31 is placed in communication with the chamber 3 whereby the contents of said chamber may be drawn off through said hose, valve 25 remaining open to the atmosphere and communication between the chamber 3 and its source of liquid supply through pipe 5 continuing to be cut off. To restore the mechanism to normal position the attendant merely pulls down on handle 28 of arm 29 until finger $21^a$ is in the position of Fig. 9 behind stop $g$. Slotted arm $25^a$ may be of such length as to constitute a stop to prevent valve 50 being moved by spring 20 beyond a dispensing position, or this purpose may be accomplished in any other suitable or desired manner.

In Figs. 14 and 17 inclusive is shown a modification in the construction of the measuring mechanism. Instead of moving a part of a tripping mechanism opposite to one of a number of abutments which move with the float, the reverse method is employed, i. e. a selected one of the abutments is moved opposite to a portion of the tripping mechanism. The abutments in this particular instance comprise an L shaped bracket K the vertical limb of which is secured by a set screw L to a sleeve M and the horizontal limb carries an adjustable abutment N adapted to engage a gravity or spring returned tripping piece O which normally prevents the fingers $21^a$ and consequently the valve arm 21 from moving to operate the valves.

The sleeve M is provided with a plurality of vertical channels K' for the reception of the said abutments, each abutment being in a different horizontal plane, and this sleeve is connected for movement in union therewith to the float 10 by means of a square section sleeve P sliding with the float over an axially rotatable vertical square rod Q, such rod Q being rotated by a radial operating handle R, which can move, over a quadrant S which is notched or otherwise marked as at S' to enable the operator to determine any particular volume of liquid it is desired to measure and deliver. The float may be marked as at 10ᵃ with numerals indicating the volume to which the apparatus is set, such numerals being adapted to be brought opposite the transparent portion 4 of the measuring chamber 3.

To enable a record to be kept of the volumes of liquid delivered by the apparatus, the sleeve M is provided with projections T diametrically opposite the channels K' and adapted to engage a finger U and to cause it to move on its pivot U' when the sleeve M descends, this finger being connected by suitable means, as for instance, by the slotted arm V, to a registering device, the well known "Veedometer" being a suitable registering device for the purpose of this invention. The finger U has a pawl portion $U^2$ for engagement by the projection T to prevent the finger being moved when the sleeve M moves upwards. It will be apparent that similar recording means may be equally well employed with the tail piece 12 in the first described modification, the registering device itself being supported by the casing accommodating the tripping mechanism, and in Fig. 1 such registering device is shown diagrammatically and indicated by the reference W.

What we claim is:—

1. In a liquid measuring and dispensing device, a chamber having liquid inlet and discharge conduits conducted therewith, vacuum producing means connected with said chamber, means to vent said chamber, a single valve controlling the inlet of liquid to and the outlet of liquid from said chamber, said valve normally establishing communication between said inlet conduit and said chamber and denying communication between said chamber and said outlet conduit, means automatically operating said valve to a position where it cuts off communication between said chamber and said inlet conduit while continuing to deny communication with said outlet conduit when a predetermined volume of liquid has entered said chamber, releasable means to hold said valve in such position, and means operating automatically upon release of said holding means to move said valve to establish communication between said chamber and said outlet conduit.

2. In a liquid measuring and dispensing device, a chamber having liquid inlet and discharge conduits connected therewith, a float within said chamber, a downward extension on said float, a plurality of fingers carried by said extension at different elevations along the same and movable therewith under the influence of liquid accumulating in said chamber, a vertically rockable trip arm swingable horizontally into the path of movement of a selected finger, a member rockable with said arm, a valve in said inlet conduit, a means between said valve and said member whereby the latter holds said valve normally in a position establishing communication between said chamber and said inlet conduit, said member being rockable, by engagement of a finger with said trip arm, to a position in which it releases said valve whereby the latter may be moved to close communication between said inlet pipe and said chamber, and means automatically so moving said valve when said member is rocked.

In witness whereof we have signed this specification.

J. R. S. HAWKER.
ALEXANDER H. HAYES.
HERBERT W. SMITH.
RALPH V. SMITH.
I. C. VICTOR SMITH.